United States Patent
Samanta et al.

(10) Patent No.: US 12,400,326 B2
(45) Date of Patent: Aug. 26, 2025

(54) AUTOMATED DISEASE DETECTION SYSTEM

(71) Applicants: TEMASEK LIFE SCIENCES LABORATORY LIMITED, Singapore (SG); PATHNOVA LABORATORIES PTE LTD, Singapore (SG)

(72) Inventors: Sudipta Samanta, Singapore (SG); Muthukaruppan Swaminathan, Singapore (SG); Jianing Hu, Singapore (SG); Chan Soh Ha, Singapore (SG); Shen-Yi Ian Cheong, Singapore (SG)

(73) Assignees: TEMASEK LIFE SICENCES LABORATORY LIMITED, Singapore (SG); PATHNOVA LABORATORIES PTE LTD, Singapore (SG)

( * ) Notice: Subject to any disclaimer, the term of this patent is extended or adjusted under 35 U.S.C. 154(b) by 446 days.

(21) Appl. No.: 18/009,138

(22) PCT Filed: Jun. 7, 2021

(86) PCT No.: PCT/SG2021/050328
§ 371 (c)(1),
(2) Date: Dec. 8, 2022

(87) PCT Pub. No.: WO2021/251903
PCT Pub. Date: Dec. 16, 2021

(65) Prior Publication Data
US 2023/0298167 A1  Sep. 21, 2023

(30) Foreign Application Priority Data
Jun. 9, 2020  (SG) ............ 10202005444X

(51) Int. Cl.
*G06N 3/0464* (2023.01)
*G06N 3/043* (2023.01)
(Continued)

(52) U.S. Cl.
CPC .......... *G06T 7/0012* (2013.01); *G06N 3/043* (2023.01); *G06N 3/0464* (2023.01); *G06N 5/048* (2013.01)

(58) Field of Classification Search
CPC ........ G06N 3/042; G06N 3/043; G06N 3/045; G06N 3/0464; G06N 3/048; G06N 3/08;
(Continued)

(56) References Cited

U.S. PATENT DOCUMENTS

| 2007/0154958 A1* | 7/2007 | Hamann ............ G01N 33/5748 435/7.2 |
| 2008/0057505 A1* | 3/2008 | Lin .................. G01N 33/54346 435/7.25 |

(Continued)

FOREIGN PATENT DOCUMENTS

| CN | 106841628 A | 6/2017 |
| WO | 2020028313 A1 | 2/2020 |

OTHER PUBLICATIONS

Joshua K. Tay et al., "The Role of Epstein-Barr Virus DNA Load and Serology as Screening Tools for Nasopharyngeal Carcinoma," Mar. 4, 2016,Otolaryngology—Head and Neck Surgery,2016, vol. 155(2), pp. 274-278.*

(Continued)

*Primary Examiner* — Omar S Ismail
(74) *Attorney, Agent, or Firm* — Rothwell, Figg, Ernst & Manbeck, P.C.

(57) ABSTRACT

The present invention relates to the provision of an automated system and a computer-implemented method for detecting a disease such as nasopharyngeal cancer (NPC) based upon the use of either a Fuzzy Inference (FI) system or a deep learning-fuzzy inference (DeLFI) hybrid model to analyse immunofluorescence assay (IFA) images. For NPC detection, the system and method of the invention would distinguish between Epstein Barr Virus (EBV) Early Anti- (Continued)

gen (EA) positive and negative cells, and identify cellular patterns which are indicative of NPC. The DeLFI hybrid model requires less human evaluation and thereby has the potential to improve the scalability and accuracy of NPC detection.

17 Claims, 12 Drawing Sheets

(51) Int. Cl.
*G06N 5/048* (2023.01)
*G06T 7/00* (2017.01)

(58) Field of Classification Search
CPC .......... G06N 5/048; G06T 2207/10024; G06T 2207/10056; G06T 2207/20081; G06T 2207/20084; G06T 2207/30072; G06T 7/0012
See application file for complete search history.

(56) References Cited

U.S. PATENT DOCUMENTS

| | | | | |
|---|---|---|---|---|
| 2010/0088264 | A1* | 4/2010 | Teverovskiy | G16H 50/20 706/46 |
| 2010/0184093 | A1* | 7/2010 | Donovan | G16B 25/00 435/287.1 |
| 2010/0267168 | A1* | 10/2010 | Hiemann | G01N 33/564 422/403 |
| 2012/0308996 | A1* | 12/2012 | Knutter | G01N 33/564 435/7.1 |
| 2013/0080134 | A1* | 3/2013 | Donovan | G16H 50/50 703/11 |
| 2013/0102486 | A1* | 4/2013 | Attardi | C12Q 1/6886 435/7.1 |
| 2017/0143852 | A1* | 5/2017 | Gao | C09B 69/103 |
| 2019/0010247 | A1* | 1/2019 | Walsh | C07K 16/3069 |
| 2019/0338290 | A1* | 11/2019 | Lowe | A61K 39/395 |
| 2019/0371425 | A1 | 12/2019 | Kuo et al. | |
| 2020/0271647 | A1* | 8/2020 | Lee | C07K 16/42 |
| 2020/0308550 | A1* | 10/2020 | Knoblich | C12N 5/0693 |
| 2020/0384083 | A1* | 12/2020 | Cook | C12N 15/1136 |

OTHER PUBLICATIONS

Joshua K. Tay et al.,"A comparison of EBV serology and serum cell-free DNA as screening tools for nasopharyngeal cancer: Results of the Singapore NPC screening cohort," Jan. 8, 2020, International Journal of Cancer,146, 2923-2931 (2020),pp. 2924-2930.*
Husnain Rashid,"Automatic Cell Detection and Counting of Microscopic Images using Machine Learning," Jan. 2020,(Doctoral dissertation, RCMS, National University of Sciences and Technology), pp. 20-50.*
Juan C Caicedo et al.,"Data-analysis strategies for image-based cell profiling," Aug. 31, 2017,nature methods ,vol. 14 No. 9 , Sep. 2017, pp. 849-856.*
Dayang Farzana Abang Sazali et al.,"Fluorescence intensity positivity classification of Hep-2 cells images using fuzzy logic," Oct. 24, 2014,3rd International Conference on Fundamental and Applied Sciences (ICFAS 2014) AIP Conf. Proc. 1621, 402-408 (2014),pp. 402-407.*
Yu Ting Felicia Wee et al.,"An integrated automated multispectral imaging technique that simultaneously detects and quantitates viral RNA and immune cell protein markers in fixed sections from Epstein-Barr virus-related tumours," Sep. 11, 2018, Annals of Diagnostic Pathology 37 (2018),pp. 12-17.*
Vincent Ricchiuti et al.,"Automated Processing and Evaluation of Anti-Nuclear Antibody Indirect Immunofluorescence Testing," May 4, 2018,Frontiers in Immunology,May 2018,vol. 9, Article 927, pp. 1-8.*
Nur Farahim binti Jamil et al.,"HEp-2 Cell Images Classification Based on Statistical Texture Analysis and Fuzzy Logic," Dec. 1, 2014, 2014 International Conference on Advances in Computing, Communications and Informatics (ICACCI), pp. 524-528.*
Sherry Meow Peng Goh et al.,"Increasing the accuracy and scalability of the Immunofluorescence Assay for Epstein Barr Virus by inferring continuous titers from a single sample dilution," Oct. 29, 2016, Journal of Immunological Methods 440 (2017), pp. 35-37.*
Sushmita Mitra et al.,"Fuzzy sets in pattern recognition and machine intelligence," Jun. 20, 2005, Fuzzy Sets and Systems 156 (2005), pp. 382-384.*
John Malcolm Nicholls et al.,"Negative plasma Epstein-Barr virus DNA nasopharyngeal carcinoma in an endemic region and its influence on liquid biopsy screening programmes," Sep. 17, 2019,British Journal of Cancer, pp. 691-696.*
Jaap M. Middeldorp,"Epstein-Barr Virus-Specific Humoral Immune Responses in Health and Disease," Jan. 1, 2015,Current Topics in Microbiology and Immunology 391,vol. 2, pp. 289-310.*
International Search Report & Written Opinion issued in International Application No. PCT/SG2021/050328 Jul. 6, 2021 (11 pages).
Wee et al., "An integrated automated multispectral imaging technique that simultaneously detects and quantitates viral RNA and immune cell protein markers in fixed sections from Epstein-Barr virus-related tumours" Annals of Diagnostic Pathology, vol. 37, 2018 (8 pages).
Goh et al., "Increasing the accuracy and scalability of the Immunofluorescence Assay for Epstein Barr Virus by inferring continuous titers from a single sample dilution" Journal of Immunological Methods, vol. 440, 2017 (6 pages).
Sazali et al., "Fluorescence intensity positivity classification of Hep-2 cells images using fuzzy logic" AIP Conference Proceedings 1621, 402, 2014 (8 pages).
Caicedo et al., "Data-analysis strategies for image-based cell profiling" Nature Methods, vol. 14, No. 9, Sep. 2017 (15 pages).
Screening Test Review Committee. Report of the Screening Test Review Committee. (2019) (93 pages).
Chan, S. H. et al. MOH Clinical Practice Guidelines Jan. 2010. (2010) (123 pages).
Middeldorp, J. M. Epstein-Barr Virus-Specific Humoral Immune Responses in Health and Disease. Curr. Top. Microbiol. Immunol. 391, (2015) (35 pages).
Tay, J. K. et al. The Role of Epstein-Barr Virus DNA Load and Serology as Screening Tools for Nasopharyngeal Carcinoma. Otolaryngol. Head Neck Surg. 155, (2016) (7 pages).
Tay, J. K. et al. A comparison of EBV serology and serum cell-free DNA as screening tools for nasopharyngeal cancer: Results of the Singapore NPC screening cohort. Int. J. Cancer (2019) doi:10.1002/ijc.32774 (9 pages).
Chan, S. H. et al. Epstein Barr virus (EBV) antibodies in the diagnosis of NPC—comparison between IFA and two commercial ELISA kits. Singapore Med. J. 39, (1998) (3 pages).
Coghill, A. E. et al. Epstein-Barr virus serology as a potential screening marker for nasopharyngeal carcinoma among high-risk individuals from multiplex families in Taiwan. Cancer Epidemiol. Biomarkers Prev. 23, (2014) (8 pages).
Hutajulu, S. H. et al. Seroprevalence of IgA anti Epstein-Barr virus is high among family members of nasopharyngeal cancer patients and individuals presenting with chronic complaints in head and neck area. PLoS One 12, e0180683 (2017) (11 pages).
Paramita, D. K., Fachiroh, J., Haryana, S. M. & Middeldorp, J. M. Evaluation of commercial EBV RecombLine assay for diagnosis of nasopharyngeal carcinoma. J. Clin. Virol. 42, (2008) (10 pages).
Chan, K. C. A. et al. Analysis of Plasma Epstein-Barr Virus DNA to Screen for Nasopharyngeal Cancer. N. Engl. J. Med. 377, (2017) (10 pages).
Nicholls, J. M. et al. Negative plasma Epstein-Barr virus DNA nasopharyngeal carcinoma in an endemic region and its influence on liquid biopsy screening programmes. Br. J. Cancer (2019) doi:10.1038/s41416-019-0575-6 (9 pages).
Ricchiuti, V., Adams, J., Hardy, D. J., Katayev, A. & Fleming, J. K. Automated Processing and Evaluation of Anti-Nuclear Antibody Indirect Immunofluorescence Testing. Front. Immunol. 9, 927 (2018) (11 pages).

(56) References Cited

OTHER PUBLICATIONS

Horsfall, A. C., Venables, P. J., Mumford, P. A. & Maini, R. N. Interpretation of the Raji cell assay in sera containing anti-nuclear antibodies and immune complexes. Clin. Exp. Immunol. 44, (1981) (11 pages).

Knapp, B., "Fuzzy Sets and Pattern Recognition," www.cs.princeton.edu/courses/archive/fall07/cos436/HIDDEN/Knapp/fuzzy.htm, (2004) (14 pages).

Landis, J. R. & Koch, G. G. The measurement of observer agreement for categorical data. Biometrics 33, (1977) (17 pages).

Bonanno, D., Nock, K., Smith, L., Elmore, P. & Petry, F. An approach to explainable deep learning using fuzzy inference. in Next-Generation Analyst V vol. 10207 102070D (International Society for Optics and Photonics, 2017) (6 pages).

Extended European Search Report issued in International Application No. 21821940.0 dated Jun. 10, 2024 (8 pages).

Jamil, N., et al., "HEp-2 Cell Images Classification Based on Statistical Texture Analysis and Fuzzy Logic", IEEE, 2014 (6 pages).

\* cited by examiner

302

| | No. of cells | | EA+ Index | | EBV Score | | Result |
|---|---|---|---|---|---|---|---|
| IF | High | AND | Low | AND | Low | THEN | Negative |
| IF | High | AND | High | AND | High | THEN | Positive |
| IF | Low | AND | Low | AND | Low | THEN | Borderline |
| IF | Low | AND | High | AND | High | THEN | Borderline |
| IF | Medium | AND | Low | AND | Low | THEN | Borderline |
| IF | Medium | AND | High | AND | High | THEN | Borderline |
| IF | | | Low | AND | High | THEN | Borderline |
| IF | | | High | AND | Low | THEN | Borderline |

AUTOMATED DISEASE DETECTION SYSTEM

CROSS REFERENCE TO RELATED APPLICATIONS

This application is a 35 U.S.C. § 371 National Stage of International Patent Application No. PCT/SG2021/050328, filed Jun. 7, 2021, which claims priority to SG application Ser. No. 10202005444X, filed on Jun. 9, 2020, which is incorporated by this reference.

TECHNICAL FIELD

Disclosed are embodiments related to disease detection, such as, for example, nasopharyngeal cancer (NPC) or other autoimmune diseases.

BACKGROUND

Nasopharyngeal cancer (NPC) is thought to be caused by reactivation of Epstein-Barr Virus (EBV) in the nasal epithelium. One characteristic hallmark of this reactivation is the expression of the EBV Early Antigen (EA) complex. For this reason, the detection of secretory IgA antibodies to the EA complex in patient sera is a highly-sensitive and specific biomarker for NPC (see, e.g., reference [1] and [2]). Because EA is a large complex comprising multiple protein subunits (see, e.g., reference [3]), expressing the entire native EA complex within a cell-based assay gives the broadest antigenic coverage and hence the highest sensitivity for NPC detection (see, e.g., references [4], [5], and [6]). This method, called the immunofluorescence assay (IFA) is the preferred method for NPC screening among high risk individuals. IFA is also a preferred method for detecting other diseases, such as autoimmune diseases.

SUMMARY

Certain challenges presently exist. For example, while the IFA method is a preferred method for disease screening among high risk individuals, IFA methods, unfortunately, require interpretation by a human expert and are therefore poorly standardized and non-scalable (see, e.g., reference [3]). In short, conventional IFA is more an art than a science.

Recent attempts to increase the scalability of disease screening have focused on the ELISA (see, e.g., references [7], [8], and [9]) and qPCR for EBV DNA (see, e.g., reference [10]). In both cases, these scalable methods also have a high false negative rate, which is not ideal for screening (see, e.g., references [4], [6], and [11]). The advantages of IFA by comparison, are many. A recent study showed that IFA detected new NPC cases in a high-risk population with 100% sensitivity (see, e.g., reference [5]). In three out of five patients, IFA positivity preceded visual nasoendoscopic confirmation, showing that IFA has the potential to enable early disease detection. An added advantage is that staining patterns associated with EA positive (EA+) samples are easily distinguished from false positive patterns caused by autoantibodies (see, e.g., reference [12]) and immune complexes (see, e.g., reference [13]).

Rather than replace IFA with modalities which are scalable but inferior in performance, this disclosure increases the scalability of IFA by reducing the need for human evaluation. It is known that basic pattern recognition can be used to automate the quantitation (a.k.a. titering) of IFA signal for EA+ samples (see, e.g., reference [14]). In this disclosure, an automated detection system is used to distinguish between EA+ and EA− samples to an extent comparable with an expert human evaluator.

BRIEF DESCRIPTION OF THE DRAWINGS

The accompanying drawings, which are incorporated herein and form part of the specification, illustrate various embodiments.

DETAILED DESCRIPTION

The detection of serum antibodies to Epstein-Barr Virus proteins is considered to be the gold standard for NPC screening in high-risk populations. Among current detection methods, the immunofluorescence assay (IFA) is most sensitive. Given the high survival rates of early asymptomatic patients compared to the poor prognosis for late stage NPC, IFA has tremendous life-saving potential for general population screening. The advantages of the IFA derive from the ability to identify and enumerate cellular staining patterns. In particular, IFA excels in its ability to detect low titers with faintly fluorescing positive patterns and also to exclude false positive samples which have bright but negative patterns. These advantages, however, are predicated on a highly trained IFA evaluator with suitable personality traits and stamina for microscopy work. Consequently, because IFA requires visual interpretation of cellular staining patterns by trained pathology staff, IFA is not scalable.

Figure 2:
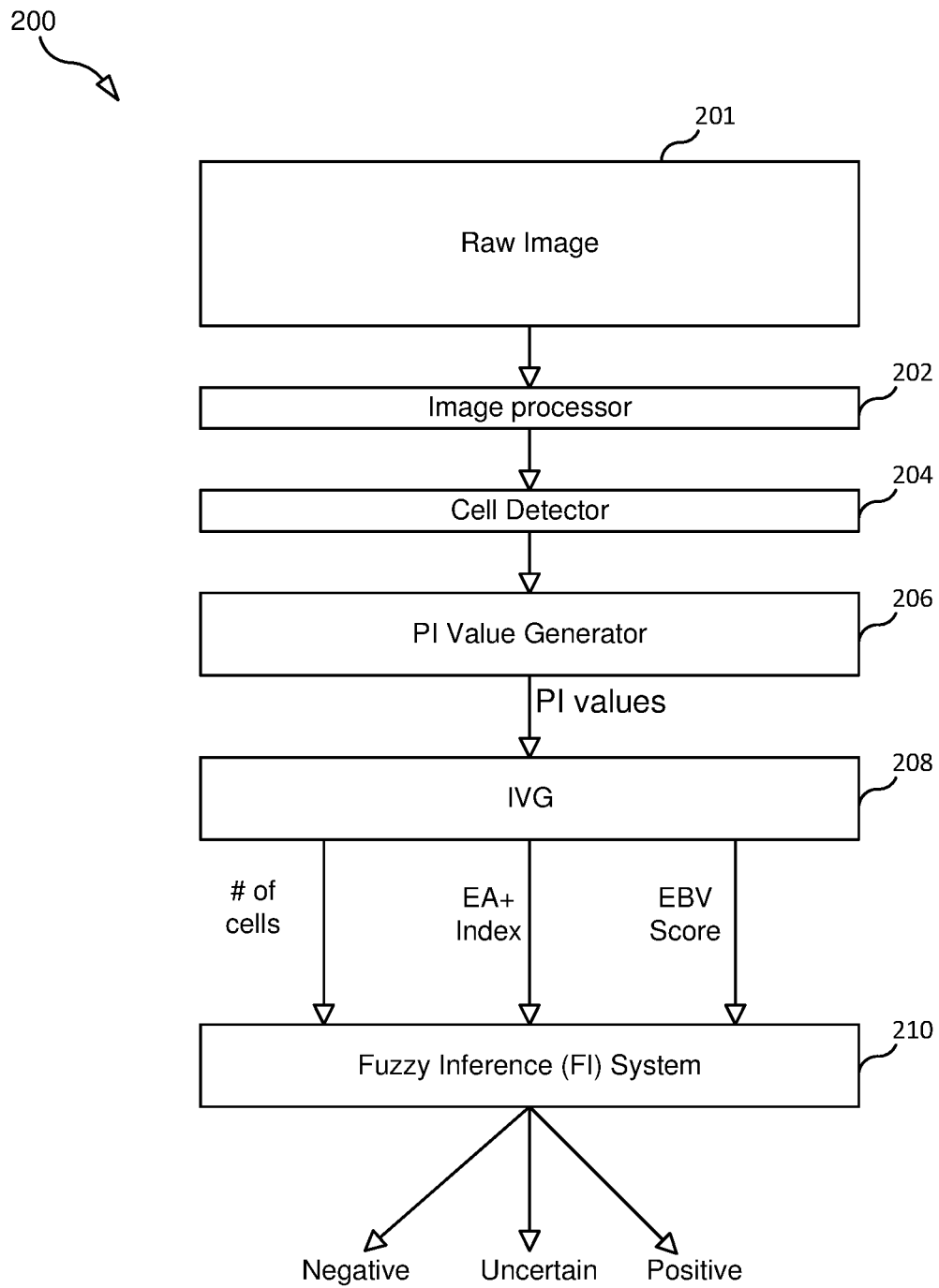
FIG. 2 illustrates a disease detection system (DDS) according to an embodiment.

Accordingly, this disclosure overcomes this disadvantage by providing an automated disease detection system (DDS) 200 (see FIG. 2). In one embodiment, detection system 200 is modeled on the IFA evaluation thought process that achieves high agreement with an expert human pathologist in identifying cellular patterns indicative of NPC. As a consequence, the detection system 200 disclosed herein greatly improves the scalability and accuracy of disease detection.

Figure 1:
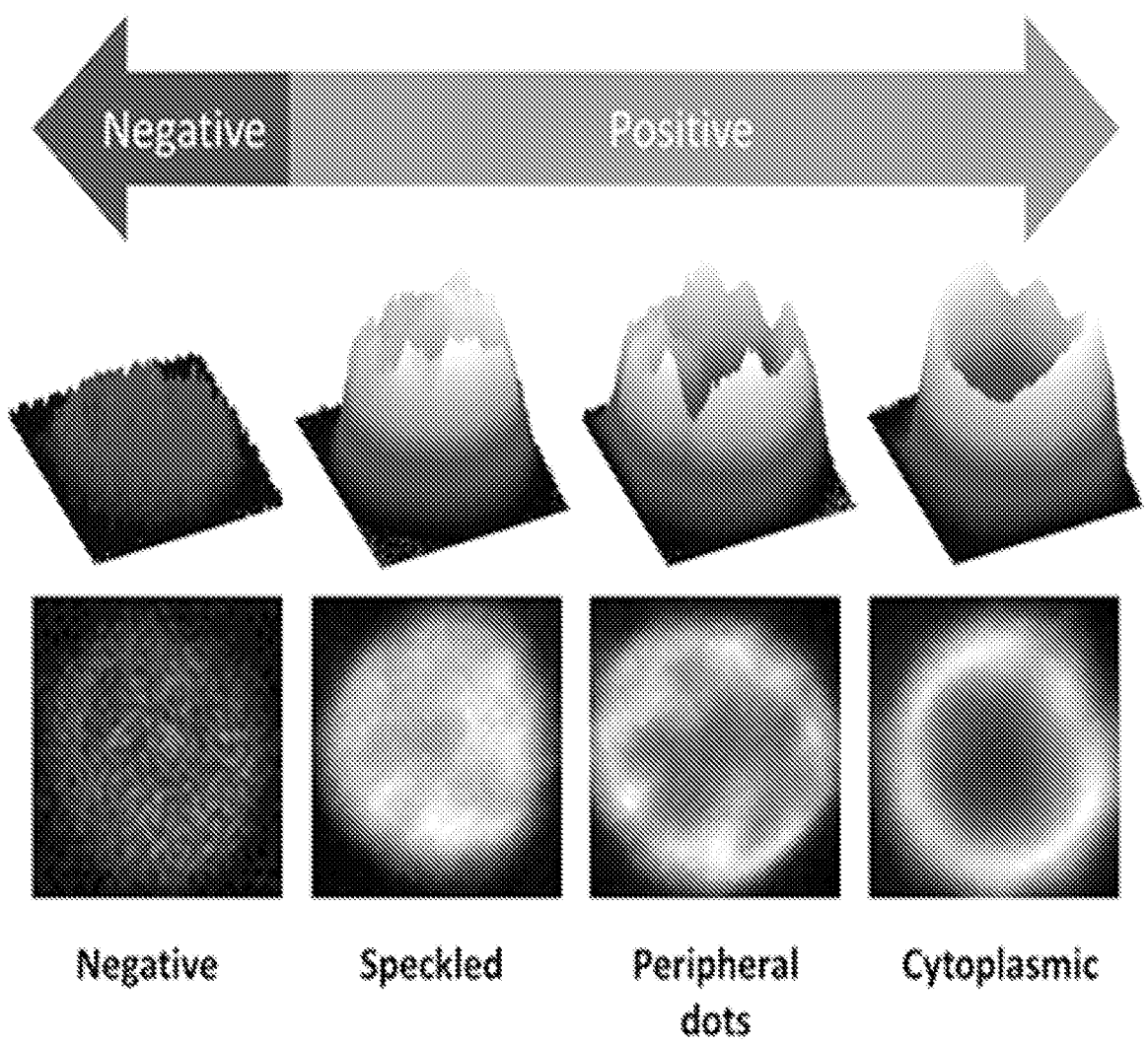
FIG. 1 illustrates typical patterns encountered in IFA.

In one embodiment, detection system 200 was designed in collaboration with an expert IFA evaluator. When an evaluator views an IFA slide, there are three fundamental input variables which are assessed. First, is there a sufficient number of cells to make a decision? Next, what proportion (if any) of these cells are brighter than baseline cell fluorescence? Finally, do these brighter cells show patterns which are consistent with test positivity. FIG. 1 illustrates typical patterns encountered in IFA. As illustrated in FIG. 1, the negative patterns tend to have low baseline fluorescence, while the positive patterns include those with a 'Speckled', 'Peripheral dots' or 'Cytoplasmic' appearance.

FIG. 2 illustrates the detection system 200 according to an embodiment. Detection system 200 includes an image processor 202 that receives as input an IFA image 201 and produces a processed IFA image. The processed image is input for the cell detector 204 that functions to detect cells in the processed IFA image. For each detected cell, pixel information regarding the detected cell is provided to a probability index (PI) generator 206 that uses the pixel information to generate a PI value (a.k.a., "patterning score") for the detected cell. These PI values are input for the input variable generator (IVG) 208 that produces three input variables: the total number of detected cells (numCells), an "EA+ Index," and an "EBV Score."

IVG 208 may calculate numCells (i.e., the total number of visible cells) by counting the number of PI values output by generator 206. IVG 208 calculates EA+ Index by determining the total number of PI values that are above a certain threshold and dividing this by numCells. That is, cells above a threshold PI value are defined as EA+ cells and their proportion within the total cell population is the EA+ Index. In one embodiment, the EBV score is the average of the set of PI values that are above the threshold.

Figure 3A:
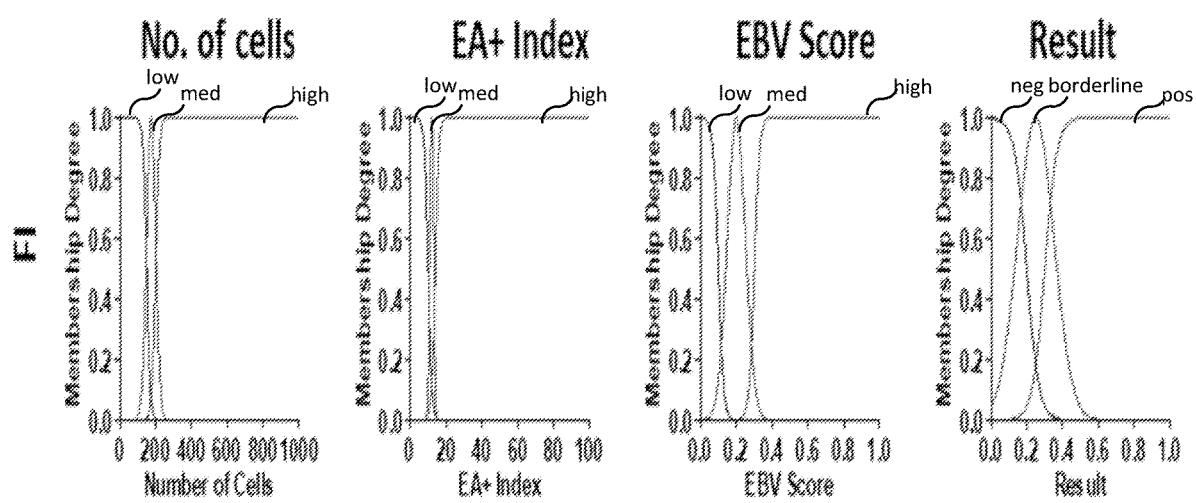
FIGS. 3A and 3B illustrate membership functions according to an embodiment.
Figure 3B:
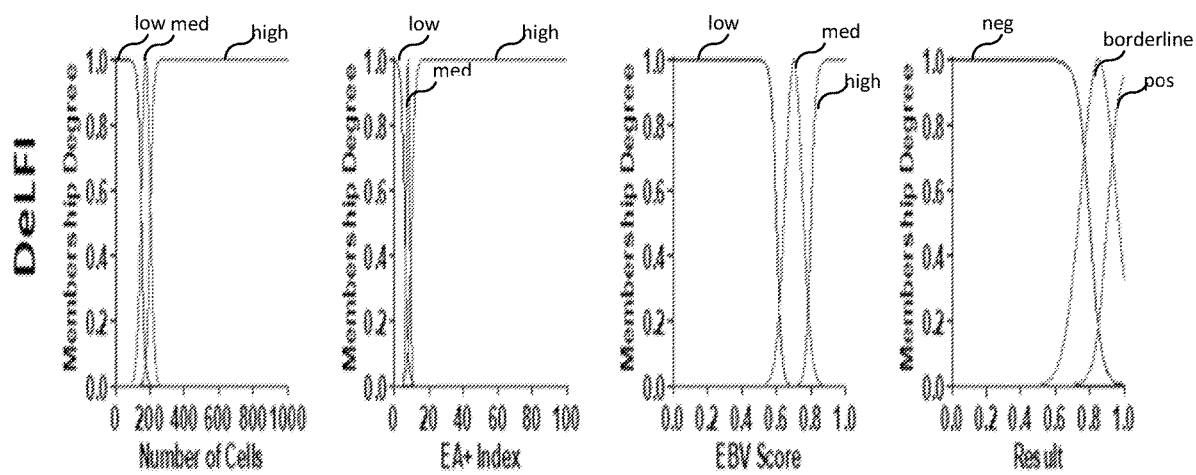
Figure 3C:
FIG. 3C illustrates fuzzy rules according to an embodiment.

The input variables are input for the Fuzzy Inference (FI) system 210, which uses the input variables and to discriminate between test-negative and test-positive samples. In one embodiment, membership functions were constructed to define Low, Medium and High ranges for the three input variables (numCells, EA+ Index, and EBV Score), as well as negative, borderline, and positive ranges for the result. FIG. 3A illustrates these membership functions for the "Fuzzy Inference (FI)" embodiment and FIG. 3B illustrates these membership functions for the "Deep Learning FI (DeLFI)" embodiment. As shown in FIGS. 3A and 3B, all three variables (numCells, EA+ Index, and EBV score) are divided into three fuzzy sets, namely: Low, Medium, and High. Both Low and High are modeled as sigmoidal while Medium is modeled as gaussian. FI system 210 employs fuzzy rules 302 (shown in FIG. 3C) to map the input variables to the output function. These fuzzy rules may be quickly summarized as follows: If numCells is High and both EA+ Index and EBV Score are High, then the output is "Positive," else if numCells is High and both EA+ Index and EBV Score are Low, then the output is "Negative," otherwise the output is "Borderline" or "Uncertain."

Figure 4:
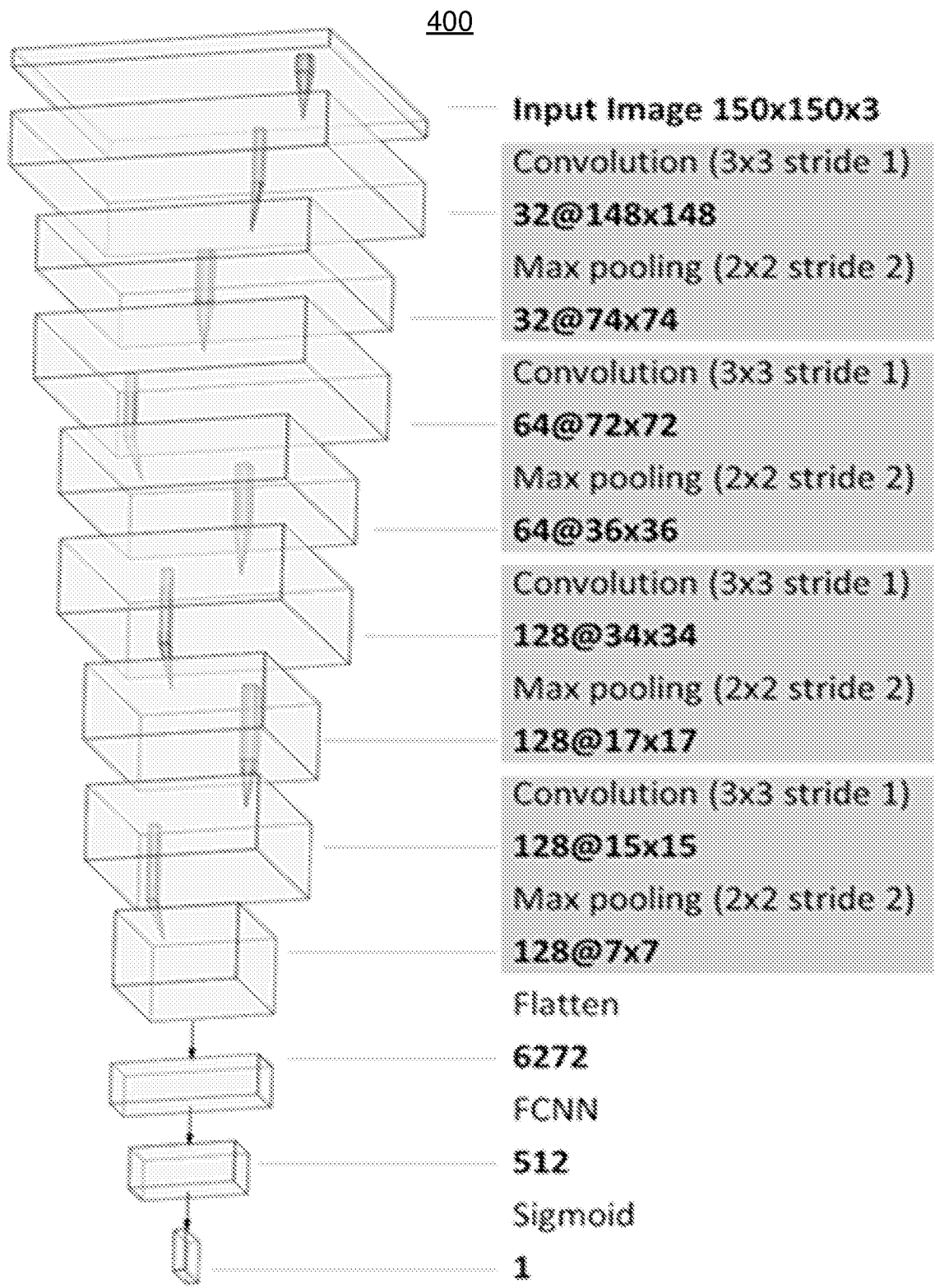
FIG. 4 illustrates convolutional neural network (CNN) according to an embodiment.

In the FI embodiment, the PI values are defined as the coefficient of variation (CV) of pixel intensities for each identified cell. In the DeLFI embodiment, the PI values for each cell are calculated using a convolutional neural network (CNN) to assign a PI value to each cell. That is, in the DeLFI embodiment, PI value generator 206 comprises a CNN, an example of which is illustrated in FIG. 4. In one embodiment, as shown in FIG. 4, CNN 400 takes a 150×150×3 image as input and consists of four convolutional blocks each comprising 3×3 convolution, ReLU activation and Max pooling. The final block was fed into 3 fully connected layers of decreasing size, culminating in the final output layer which was activated by the Sigmoid function for binary classification. CNN 400 was trained using a dataset of 550 EA+ and 550 EA− cell images identified by an IFA expert from an IFA image database.

1. Study design-Materials and Methods

Figure 5:
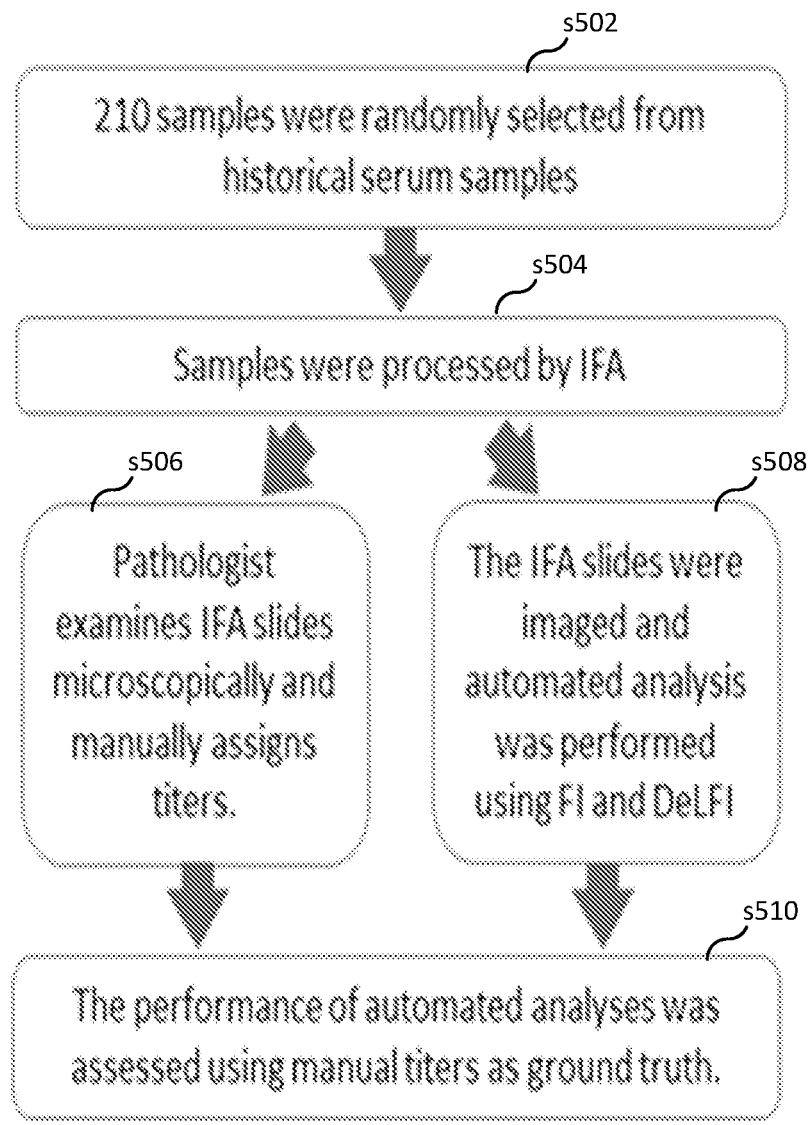
FIG. 5 is a flowchart illustrating a process according to an embodiment.

FIG. 5 illustrates a process 500 for comparing the performance of the FI and DeLFI embodiments of system 200 using manually evaluated titers of historical serum samples as ground truth. To evaluate the FI and DeLFI, two-hundred-ten (210) historical serum samples with known titers were randomly selected (see FIG. 5, step s502). All samples were processed by the IFA protocol (step s504) and titers were then manually assigned by a blinded IFA expert evaluator (step s506). In parallel with this manual evaluation, the IFA slides were also imaged at a single dilution and analyzed using FI and DeLFI (step s508). The performance of both were then assessed using the manually evaluated titers as ground truth (step s510).

1.1 Serum Samples

Two-hundred-ten (210) anonymized serum samples historically screened at the World Health Organization Collaborating Centre for Research and Training in Immunology, Singapore were obtained. The following table shows the distribution of samples according to their assigned titers.

|  | Titers | | | | |
| --- | --- | --- | --- | --- | --- |
|  | Negative | 1:10 | 1:40 | 1:160 | 1:640 |
| Number of Samples | 74 | 19 | 53 | 37 | 27 |

All samples were processed according to standard IFA protocols as described below. The IFA-processed well with serum dilution 1:2.5 was imaged at 20× magnification with a fixed 30-ms exposure time on a Leica DM4500B microscope with a scientific CMOS image sensor camera (pco.edge 3.1).

1.2. Immuno-Fluorescence Assay (IFA)

An indirect Immuno-Fluorescence Assay (IFA) was used to measure anti-EBV-EA IgA serology titres, as previously described (see, e.g., references [4], [5], and [14]. Briefly, Raji and P3HR1 cells were cultured in flasks and then induced with Sodium butyrate (3 mM) and Phorbol 12-myristate-13-acetate (20 pg/ml) for 2 days in a 37° C. $CO_2$ incubator. Induced cells were then washed 4 times in PBS by centrifugation, discarding the supernatant and resuspending the pellet in PBS. The resulting cell suspension was then dispensed onto Teflon coated slides using a multichannel pipettor. Slides were allowed to air dry overnight on the bench, then fixed in ice cold acetone for 10 minutes and allowed to dry completely. Fixed slides were stored in −80° C. until used. Fixed slides coated with Raji cells (EA) were incubated for 30 min with 10 µL of sera which had been serially diluted in PBS (1:10, 1:40, 1:160 and 1:640). For EBV-EA IgA, serum dilutions at 1:5 were also tested. The slides were then rinsed and incubated for a further 30 min with fluorescein-conjugated anti-human IgA rabbit antibody (SPD Scientific, Singapore), and then evaluated under a Leica DM4500B fluorescence microscope with a scientific CMOS image sensor camera (pco.edge 3.1) for capturing the IFA image 201.

1.3 Image Processor 202 and Cell Detector 204

Image processor 202 was used to process IFA image 201 to produce a processed IFA image. In on embodiment, image processor 202 first smoothed the IFA image 202 thereby producing a smoothened image. In this particular example, a median filter of size (5×5) was applied to smooth the image. Next, the background was suppressed. In this example, an open-by-reconstruction top-hat was applied to the smoothened image to suppress the background. This operator was applied with a square structuring element (SE) of 41-pixel size. The resulting image was then thresholded using Rosin's method to separate the background region from the foreground region, thereby producing a binarized image. This binarized image was then refined by filling holes (i.e., the areas of black pixels surrounded by white pixels in the binarized image) using the application of morphological reconstruction followed by binary opening with a disk shape SE of 3-pixel diameter. To remove the non-cellular objects from the refined binary image, an area size filter (min size: 700 and max size: 7000) was applied, thereby producing a filtered refined binary image. Cell detector 204 separated the foreground objects from this filtered image into individual cells using the marker-controlled watershed algorithm with the local maxima of the geodesic distance map serving as the seeds. As a post-processing step, regions that were not circular (threshold: 0.4) were removed.

1.4 PI Value Generator 206 and EA+ Cell Detection

Following cell detection, a non-dimensional index, called probability index (PI) was calculated for each of the detected cells using two different techniques (i) Coefficient of Variation (CV) and (ii) Deep Learning (DL). For the CV approach, $PI=\sigma/\mu$ where $\mu$ and $\sigma$ are the mean and standard deviation of the pixel intensities of a detected cell. For the DL approach, a CNN (e.g., CNN 400) was employed to classify EA+ and EA− cells. The output layer of the CNN consisted of a single neuron with the sigmoid activation function. This output was used as the PI value for the DL approach. A higher PI value here indicates similarity with a training set of EA+ cell images. Section 1.5 below describes the design and training of the CNN.

A higher PI value indicates higher variability in fluorescence which correlates with EA+ staining. PI values were calculated for all detected cells using both the CV and DL approaches. A given detected cell, cell_i, is classified as EA+ if the PI value for the given cell, PI_i is greater than or greater than or equal to a threshold, otherwise the cell is classified as EA−. For the CV PI values, a cell is classified as EA+ if the CV-PI value for the cell is greater than or equal to: $(\mu_c+\sigma_c)$, where $\mu_c+\sigma_c$ are the mean and standard deviation of the Poisson-Binomial distribution of the CV PI values {CV-PI_1, CV-PI_2, ..., CV-PI_NI} for N detected cells. For the DL PI values (i.e., {DL-PI_1, DL-PI_2, ..., DL-PIN}), a cell is classified as EA+ if the DL-PI value for the cell is greater than 0.5.

The EBV score was obtained by averaging the PI values of the EA+ cells. EA+ Index is the ratio of the number of EA+ cells to total number of cells.

1.5. Convolutional Neural Network (Design and Training)

The CNN 400 was designed for EA-positive and EA-negative cells classification. The CNN takes a 150×150×3 image as an input. the CNN consists of four convolutional blocks composed of 3×3 convolution-ReLU activation-Max pooling, with 32, 64, 128, and 128 kernels respectively. All four Max pooling operations were performed with stride=2 to reduce the output dimensions of the convolutional operations. The last convolutional block was connected with 3 fully connected layers of size 6272, 512, and 1. The final output layer was activated with the sigmoid activation function for binary classification. The CNN-model was trained using a dataset of 550 EA+ and 550 EA− cell images identified by an IFA expert.

1.6 Fuzzy Inference (FI) System 210

FI system 210 is used to discriminate between the test-negative and test-positive samples based on the three input variables: numCells, the EA+ Index, and the EBV Score, which are also referred to as the "crisp-input" values. The FI system mapped the crisp-input values to a crisp-output value using fuzzy set theory. As is known in the art, the main elements of the FI system are a fuzzifier, fuzzy rules (a.k.a., fuzzy rule base), inference engine, and defuzzifier (see, e.g., reference [17], chapter 4 "Fuzzy Inference Systems"). The functioning of the FI system is summarized as follows.

1: The fuzzifier maps the crisp input values and output variables to fuzzy values (0 to 1) using the above described membership functions.

2: The fuzzified inputs are then interpreted by a fuzzy rule base (in the form of IF-THEN rules) which describes how the FI system should make a decision for a set of inputs.

3: The inference engine activates the rules for a given set of inputs and finds the consequence of the rules by combining the rule strength and output membership functions. These consequences are then combined to get a fuzzy output.

4: The fuzzy output is then converted to crisp output using the defuzzifier.

More specifically, each of the three input variables was modeled as 3 fuzzy sets with the following membership functions: low' (sigmoidal), 'Medium' (gaussian) and 'High' (sigmoidal). Fuzzy rules were created in consultation with IFA expert. The output variable was similarly modeled as 3 fuzzy sets with the following membership functions: 'Negative' (sigmoidal), 'Borderline' (gaussian) and 'Positive' (sigmoidal). Parameters for these input variables and the output variable were estimated using IFA images of reference samples comprising 39 negative and 132 positive control samples. The defuzzified crisp output values were then used for classification by setting the threshold for positivity.

Receiver Operator Characteristic (ROC) curves were generated by evaluating sensitivity and specificity across the defuzzified output range. Optimal performance was defined as the point which maximizes Youden's J (sensitivity+specificity−1). Cohen's k was calculated using:

$k=(Po-Pe)/(1-Pe)$, where $Po=(TP+TN)/(TP+TN+FP+FN)$, and $Pe=((TP+FN)\times(TP+FP)+(FP+TN)\times(FN+TN))/(TP+TN+FP+FN)^2$.

1.7 The Uncertainty Filter

In case of decision making with the uncertainty filter, we evaluated performance using the defuzzified output values only after excluding samples which fell within the uncertainty window which we defined as ±0.05 of the defuzzified output threshold. The uncertainty window ranges used in this study are the crisp output ranges described in Table 3.

Performance of FI and DeLFI

Figure 6A:
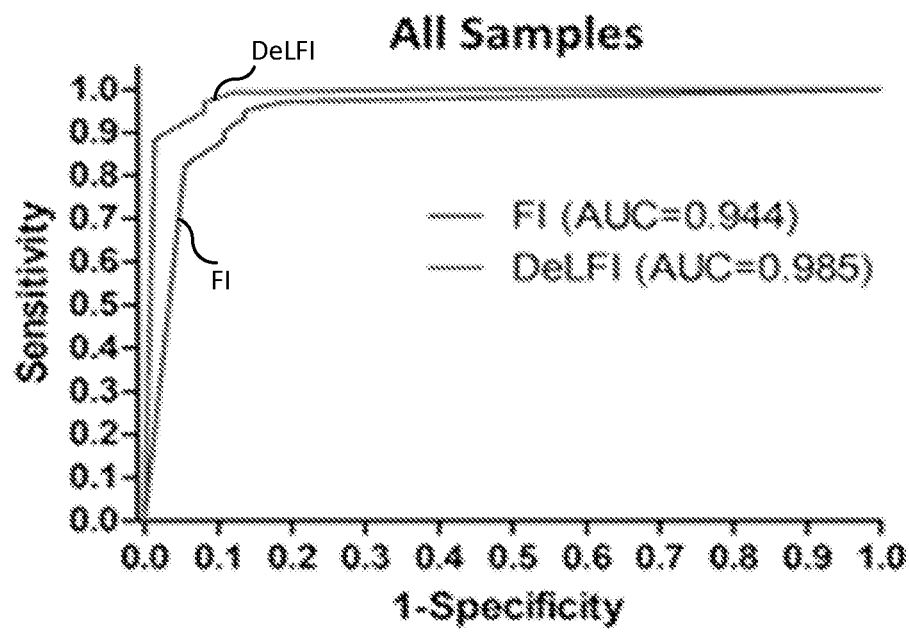
FIGS. 6A and 6B show ROC curves.
Figure 6B:
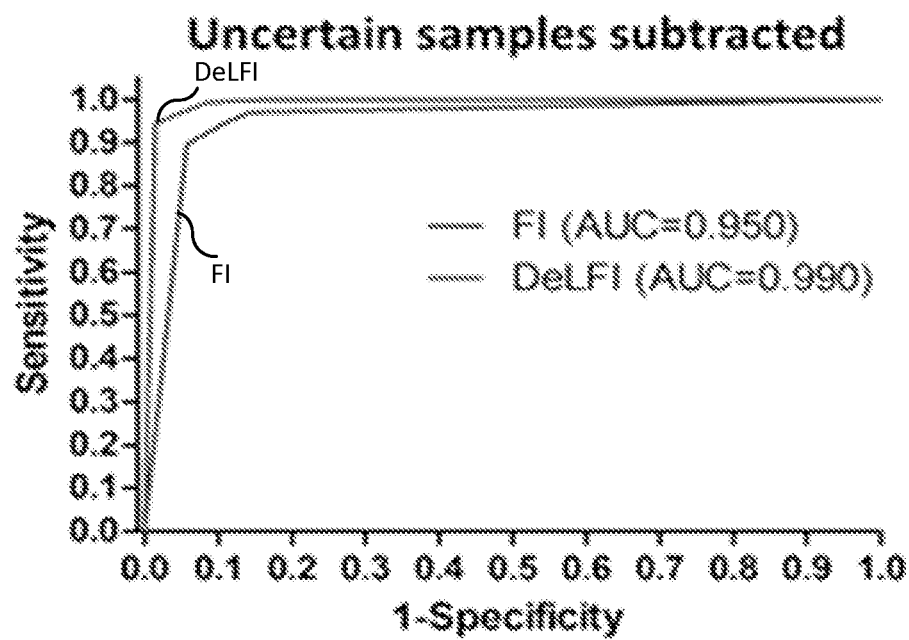

The performance of FI and DeLFI was evaluated by their ROC curves (FIG. 6A and FIG. 6B). First, both sensitivity (sen) and specificity (spe) with respect to ground truth was evaluated at different thresholds of the defuzzified output (a.k.a., crisp output) values. Only samples greater than or equal to the threshold were taken as test positive. This analysis was also repeated after excluding samples which fell within ±0.05 of the defuzzified output threshold. In a real workflow, samples excluded by this 'uncertainty filter' would be manually evaluated by an IFA specialist.

Both FI (AUC=0.944) and DeLFI (AUC=0.985) performed well under ROC analysis when all samples were analyzed without the uncertainty filter (FIG. 6A), demonstrating that both FI and DeLFI were highly concordant with evaluations made by our IFA expert. At their optimal cutoff values, both DeLFI (sen=0.971, spe=0.919) and FI (sen=0.949, spe=0.865) gave summary statistics with reasonable performance.

TABLE 1

(FI All Samples)

| Cutoff | TN | FP | TP | FN | Sensitivity % | Specificity % | PPV % | NPV % | Cohen's κ |
|---|---|---|---|---|---|---|---|---|---|
| ≥0.050 | 0 | 74 | 136 | 0 | 100.00 | 0.00 | 64.76 | 0.00 | 0.00 |
| ≥0.100 | 0 | 74 | 136 | 0 | 100.00 | 0.00 | 64.76 | 0.00 | 0.00 |
| ≥0.150 | 0 | 74 | 136 | 0 | 100.00 | 0.00 | 64.76 | 0.00 | 0.00 |
| ≥0.200 | 0 | 74 | 136 | 0 | 100.00 | 0.00 | 64.76 | 0.00 | 0.00 |
| ≥0.250 | 0 | 74 | 136 | 0 | 100.00 | 0.00 | 64.76 | 0.00 | 0.00 |
| ≥0.300 | 60 | 14 | 132 | 4 | 97.06 | 81.08 | 90.41 | 93.75 | 0.81 |
| ≥0.350 | 63 | 11 | 130 | 6 | 95.59 | 85.14 | 92.20 | 91.30 | 0.82 |
| ≥0.400 | 64 | 10 | 129 | 7 | 94.85 | 86.49 | 92.81 | 90.14 | 0.82 |
| ≥0.450 | 64 | 10 | 127 | 9 | 93.38 | 86.49 | 92.70 | 87.67 | 0.80 |
| ≥0.500 | 66 | 8 | 123 | 13 | 90.44 | 89.19 | 93.89 | 83.54 | 0.78 |
| ≥0.550 | 66 | 8 | 120 | 16 | 88.24 | 89.19 | 93.75 | 80.49 | 0.76 |
| ≥0.600 | 70 | 4 | 112 | 24 | 82.35 | 94.59 | 96.55 | 74.47 | 0.72 |
| ≥0.650 | 74 | 0 | 0 | 136 | 0.00 | 100.00 | 0.00 | 35.24 | 0.00 |
| ≥0.700 | 74 | 0 | 0 | 136 | 0.00 | 100.00 | 0.00 | 35.24 | 0.00 |
| ≥0.750 | 74 | 0 | 0 | 136 | 0.00 | 100.00 | 0.00 | 35.24 | 0.00 |
| ≥0.800 | 74 | 0 | 0 | 136 | 0.00 | 100.00 | 0.00 | 35.24 | 0.00 |
| ≥0.850 | 74 | 0 | 0 | 136 | 0.00 | 100.00 | 0.00 | 35.24 | 0.00 |
| ≥0.900 | 74 | 0 | 0 | 136 | 0.00 | 100.00 | 0.00 | 35.24 | 0.00 |
| ≥0.950 | 74 | 0 | 0 | 136 | 0.00 | 100.00 | 0.00 | 35.24 | 0.00 |
| ≥1.000 | 74 | 0 | 0 | 136 | 0.00 | 100.00 | 0.00 | 35.24 | 0.00 |

TABLE 2

(DeLFI All Samples)

| Cutoff | TN | FP | TP | FN | Sensitivity % | Specificity % | PPV % | NPV % | Cohen's κ |
|---|---|---|---|---|---|---|---|---|---|
| ≥0.050 | 14 | 60 | 136 | 0 | 100.00 | 18.92 | 69.39 | 100.00 | 0.23 |
| ≥0.100 | 14 | 60 | 136 | 0 | 100.00 | 18.92 | 69.39 | 100.00 | 0.23 |
| ≥0.150 | 14 | 60 | 136 | 0 | 100.00 | 18.92 | 69.39 | 100.00 | 0.23 |
| ≥0.200 | 14 | 60 | 136 | 0 | 100.00 | 18.92 | 69.39 | 100.00 | 0.23 |
| ≥0.250 | 14 | 60 | 136 | 0 | 100.00 | 18.92 | 69.39 | 100.00 | 0.23 |
| ≥0.300 | 14 | 60 | 136 | 0 | 100.00 | 18.92 | 69.39 | 100.00 | 0.23 |
| ≥0.350 | 14 | 60 | 136 | 0 | 100.00 | 18.92 | 69.39 | 100.00 | 0.23 |
| ≥0.400 | 14 | 60 | 136 | 0 | 100.00 | 18.92 | 69.39 | 100.00 | 0.23 |
| ≥0.450 | 45 | 29 | 136 | 0 | 100.00 | 60.81 | 82.42 | 100.00 | 0.67 |
| ≥0.500 | 45 | 29 | 136 | 0 | 100.00 | 60.81 | 82.42 | 100.00 | 0.67 |
| ≥0.550 | 45 | 29 | 136 | 0 | 100.00 | 60.81 | 82.42 | 100.00 | 0.67 |
| ≥0.600 | 45 | 29 | 136 | 0 | 100.00 | 60.81 | 82.42 | 100.00 | 0.67 |
| ≥0.650 | 47 | 27 | 136 | 0 | 100.00 | 63.51 | 83.44 | 100.00 | 0.69 |
| ≥0.700 | 65 | 9 | 135 | 1 | 99.26 | 87.84 | 93.75 | 98.48 | 0.89 |
| ≥0.750 | 68 | 6 | 132 | 4 | 97.06 | 91.89 | 95.65 | 94.44 | 0.90 |
| ≥0.800 | 68 | 6 | 129 | 7 | 94.85 | 91.89 | 95.56 | 90.67 | 0.86 |
| ≥0.850 | 72 | 2 | 122 | 14 | 89.71 | 97.30 | 98.39 | 83.72 | 0.84 |
| ≥0.900 | 73 | 1 | 120 | 16 | 88.24 | 98.65 | 99.17 | 82.02 | 0.83 |
| ≥0.950 | 74 | 0 | 0 | 136 | 0.00 | 100.00 | 0.00 | 35.24 | 0.00 |
| ≥1.000 | 74 | 0 | 0 | 136 | 0.00 | 100.00 | 0.00 | 35.24 | 0.00 |

Table 1 shows performance metrics for FI at varying crisp-output cutoff thresholds. The optimal cutoff value, defined as the point which maximizes Youden's J (sensitivity+specificity−1) is 0.400 and the AUC is 0.944. Table 2 shows performance metrics for DeLFI at varying crisp-output cutoff thresholds. The optimal cutoff value, defined as the point which maximizes Youden's J (sensitivity+specificity−1) is 0.750 and the AUC is 0.985.

This was also reflected in Cohen's kappa at these cutoffs, which showed that both DeLFI (κ=0.90) and FI (κ=0.82) were in near perfect agreement with manual evaluations (see, e.g., reference [15]). When the uncertainty filter was active, the AUC's for both FI (AUC=0.950) and DeLFI (AUC=0.990) increased but with DeLFI still outperforming FI (FIG. 6B). As expected, summary statistics at their optimal cutoffs also improved for both DeLFI (sens=0.945, spe=0.986) and FI (sen=0.896, spe=0.943).

TABLE 3

(FI Uncertain Samples Subtracted)

| Crisp Output Range | TN | FP | TP | FN | Uncertain Positives | Uncertain Negatives | Sensitivity % | Specificity % | PPV % | NPV % | Cohen's κ |
|---|---|---|---|---|---|---|---|---|---|---|---|
| [0.0-0.1) | 0 | 74 | 136 | 0 | 0 | 0 | 100.00% | 0.00% | 64.76% | 0.00% | 0.00 |
| [0.1-0.2) | 0 | 74 | 136 | 0 | 0 | 0 | 100.00% | 0.00% | 64.76% | 0.00% | 0.00 |
| [0.2-0.3) | 0 | 14 | 132 | 0 | 4 | 60 | 100.00% | 0.00% | 90.41% | 0.00% | 0.00 |
| [0.3-0.4) | 60 | 10 | 129 | 4 | 3 | 4 | 96.99% | 85.71% | 92.81% | 93.75% | 0.84 |
| [0.4-0.5) | 64 | 8 | 123 | 7 | 6 | 2 | 94.62% | 88.89% | 93.89% | 90.14% | 0.84 |
| [0.5-0.6) | 66 | 4 | 112 | 13 | 11 | 4 | 89.60% | 94.29% | 96.55% | 83.54% | 0.82 |
| [0.6-0.7) | 70 | 0 | 0 | 24 | 112 | 4 | 0.00% | 100.00% | 0.00% | 74.47% | 0.00 |
| [0.7-0.8) | 74 | 0 | 0 | 136 | 0 | 0 | 0.00% | 100.00% | 0.00% | 35.24% | 0.00 |
| [0.8-0.9) | 74 | 0 | 0 | 136 | 0 | 0 | 0.00% | 100.00% | 0.00% | 35.24% | 0.00 |
| [0.9-1.0) | 74 | 0 | 0 | 136 | 0 | 0 | 0.00% | 100.00% | 0.00% | 35.24% | 0.00 |

TABLE 4

(DeLFI Uncertain Samples Substracted)

| Crisp Output Range | TN | FP | TP | FN | Uncertain Positives | Uncertain Negatives | Sensitivity % | Specificity % | PPV % | NPV % | Cohen's κ |
|---|---|---|---|---|---|---|---|---|---|---|---|
| [0.0-0.1) | 0 | 60 | 136 | 0 | 0 | 14 | 100.00% | 0.00% | 69.39% | 0.00% | 0.00 |
| [0.1-0.2) | 14 | 60 | 136 | 0 | 0 | 0 | 100.00% | 18.92% | 69.39% | 100.00% | 0.23 |
| [0.2-0.3) | 14 | 60 | 136 | 0 | 0 | 0 | 100.00% | 18.92% | 69.39% | 100.00% | 0.23 |
| [0.3-0.4) | 14 | 60 | 136 | 0 | 0 | 0 | 100.00% | 18.92% | 69.39% | 100.00% | 0.23 |
| [0.4-0.5) | 14 | 29 | 136 | 0 | 0 | 31 | 100.00% | 32.56% | 82.42% | 100.00% | 0.42 |
| [0.5-0.6) | 45 | 29 | 136 | 0 | 0 | 0 | 100.00% | 60.81% | 82.42% | 100.00% | 0.67 |
| [0.6-0.7) | 45 | 9 | 135 | 0 | 1 | 20 | 100.00% | 83.33% | 93.75% | 100.00% | 0.88 |
| [0.7-0.8) | 65 | 6 | 129 | 1 | 6 | 3 | 99.23% | 91.55% | 95.56% | 98.48% | 0.92 |
| [0.8-0.9) | 68 | 1 | 120 | 7 | 9 | 5 | 94.49% | 98.55% | 99.17% | 90.67% | 0.91 |
| [0.9-1.0) | 73 | 0 | 0 | 16 | 120 | 1 | 0.00% | 100.00% | 0.00% | 82.02% | 0.00 |

Table 3 shows performance of FI (after subtracting uncertain samples). Uncertain samples were defined as samples included within a particular crisp output range. Performance metrics for each crisp output range were generated after subtracting these uncertain samples. The optimal crisp output range, defined as the range which maximizes Youden's J (sensitivity+specificity−1), is [0.5-0.6] and the AUC is 0.950.

Table 4 shows performance of DeLFI (after subtracting uncertain samples). Uncertain samples were defined as samples included within a particular crisp output range. Performance metrics for each crisp output range were generated after subtracting these uncertain samples. The optimal crisp output range, defined as the range which maximizes Youden's J (sensitivity+specificity−1), is [0.8-0.9] and the AUC is 0.990.

At these cutoff values, DeLFI produced 14 uncertain samples (6.7% of total) which was comparable to and no greater than the 15 uncertain samples (7.1% of total) for FI. Hence, DeLFI's outperformance of FI was not due to an increase in uncertain samples being excluded from analysis. Cohen's kappa increased for both DeLFI (max κ=0.92) and FI (max κ=0.84), showing that the removal of uncertain samples made a small but discernible improvement to concordance.

Figure 7:
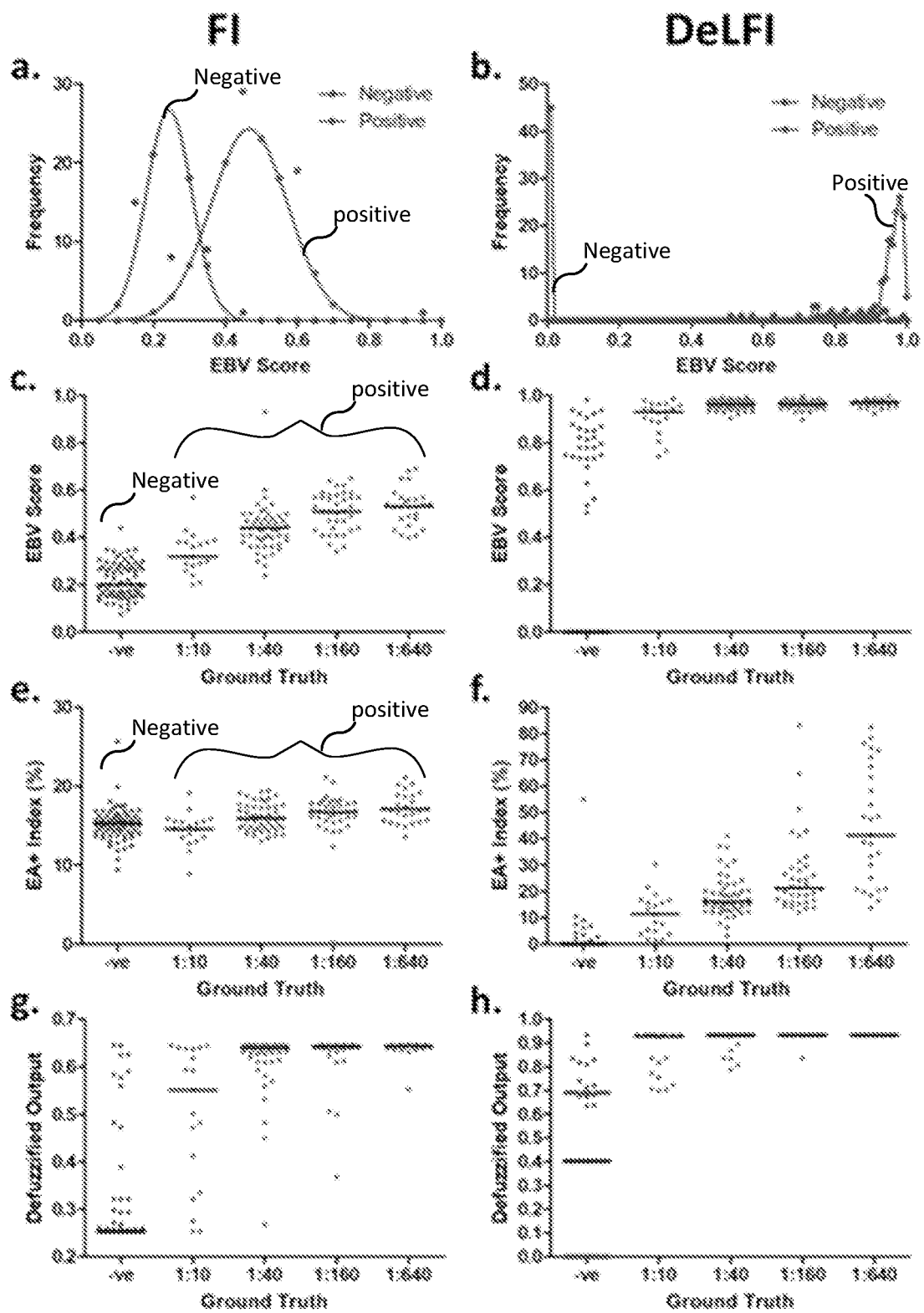
FIGS. 7A and 7B show distributions for EBV Scores and EA+ Indexes.
FIGS. 7C, 7D, 7E, and 7F show EBV Score and EA+ Index plotted against ground truth.
FIGS. 7G and 7H show defuzzified output values plotted against ground truth.

While both FI and DeLFI performed robustly, DeLFI outperformed FI substantially in every comparison. To understand the differences between FI and DeLFI, we plotted distributions for their EBV Scores and EA+Index. We found that EBV Score distributions were indeed significantly different for FI and DeLFI (FIG. 7A and FIG. 7B). A relatively higher degree of overlap between positive and negative sample distributions was observed for FI, whereas in comparison, the distributions for DeLFI were biased towards the extreme ends of the EBV Score Range.

Interesting trends emerged when both EBV Score and EA+Index were each plotted against ground truth (FIGS. 7C-F). In the case of FI, EBV Score showed a monotonic increase across all ground truth classes but EA+ Index remained largely constant. In the case of DeLFI by comparison, it was EA+ Index and not EBV Score which showed proportionality across all ground truth classes. Hence, FI's EBV Score and DeLFI's EA+ Index can both be used to infer EA titers in addition to assessing test positivity.

Since FI identified approximately the same proportion of EA+ cells in all images regardless of titer, the discriminative power for FI must hence have been provided by the EBV Score. This was in contrast to DeLFI where both EBV Score and EA+ Index discriminated between negative and positive samples. This improved discrimination was reflected in DeLFI's cleaner separation between negatives and positives when defuzzified output values were plotted against ground truth (FIG. 7G-H). This made it easier to find a cutoff which achieved high sensitivity and specificity. In comparison, FI exhibited relatively longer tails which overlapped between negative and positive samples which accounts for their slightly worse performance.

Figure 8:
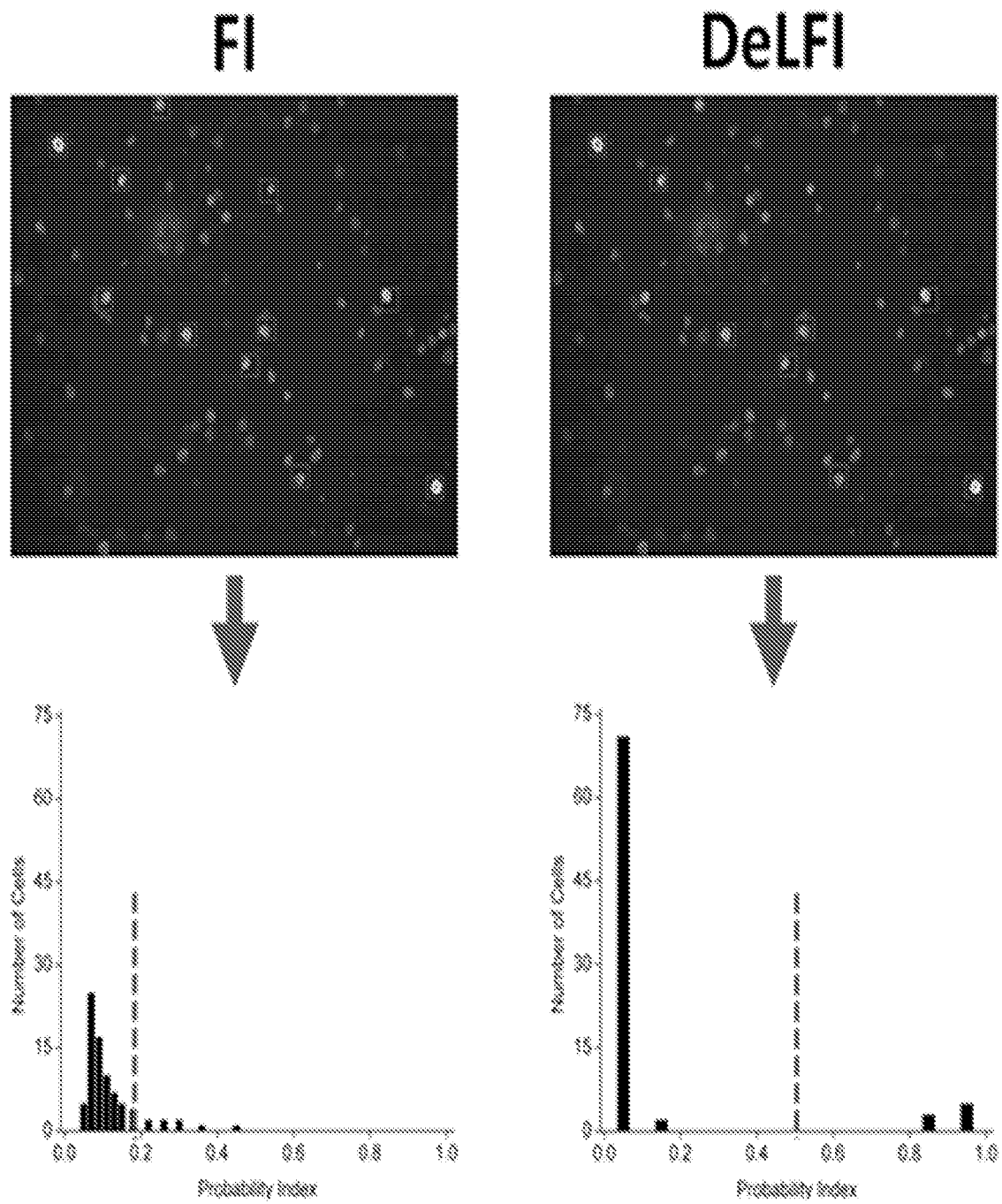
FIG. 8 shows the distributions of PI compared for both FI and DeLFI

EBV Score and EA+ Index are ultimately derived from PI values, so we wondered how PI values were distributed for FI and DeLFI given a typical IFA image. Here, we observed that the distributions recapitulated what was observed with EBV Score distributions, with the positive and negative distributions for DeLFI separated more dramatically than for FI (see FIG. 8). FIG. 8 shows the distributions of PI compared for both FI and DeLFI. PI distributions for both FI and DeLFI are shown for a single typical IFA image. The dotted line depicts the threshold above which cells are considered to be EA+. The distribution for FI shows a unimodal distribution with a positive skew whereas DeLFI produces a bimodal distribution clearly separated by the threshold. The above analyses lead us to conclude that the fundamental basis for DeLFI edging out FI in performance is that its underlying PI values are more discriminatory between negative and positive samples.

Figure 10:
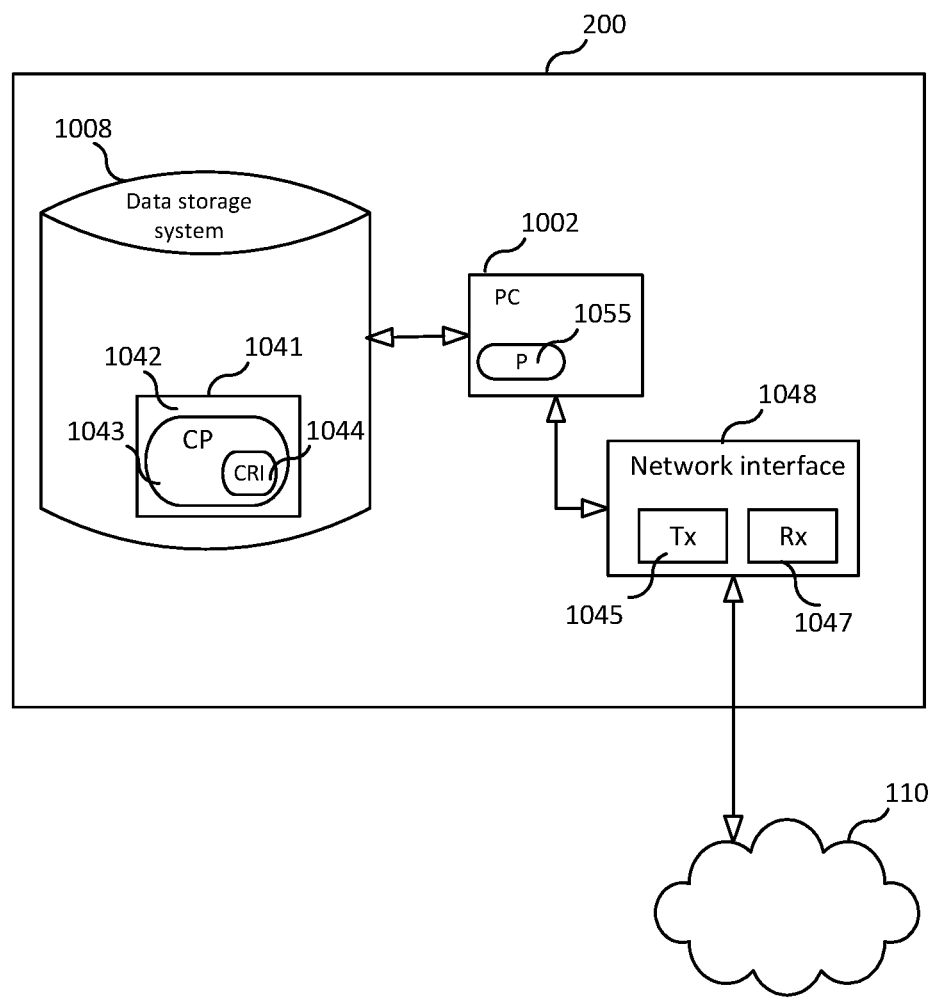
FIG. 10 illustrates the DDS according to some embodiments.

FIG. 10 is a block diagram of disease detection system (DDS) 200, according to some embodiments. As shown in FIG. 10, DDS 200 comprises: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., DDS 200 may be a distributed computing system); at least one network interface 1048 comprising a transmitter (Tx) 1045 and a receiver (Rx) 1047 for enabling DDS 200 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes DDS 200 to perform steps described herein (e.g., steps described herein with reference to the flow charts). In other embodiments, DDS 200 may be configured to perform steps described herein without the need for code. That is, for example, PC 1002 may consist merely of one or more ASICs. Hence, the features of the embodiments described herein may be implemented in hardware and/or software.

SUMMARY OF VARIOUS EMBODIMENTS

Figure 9:
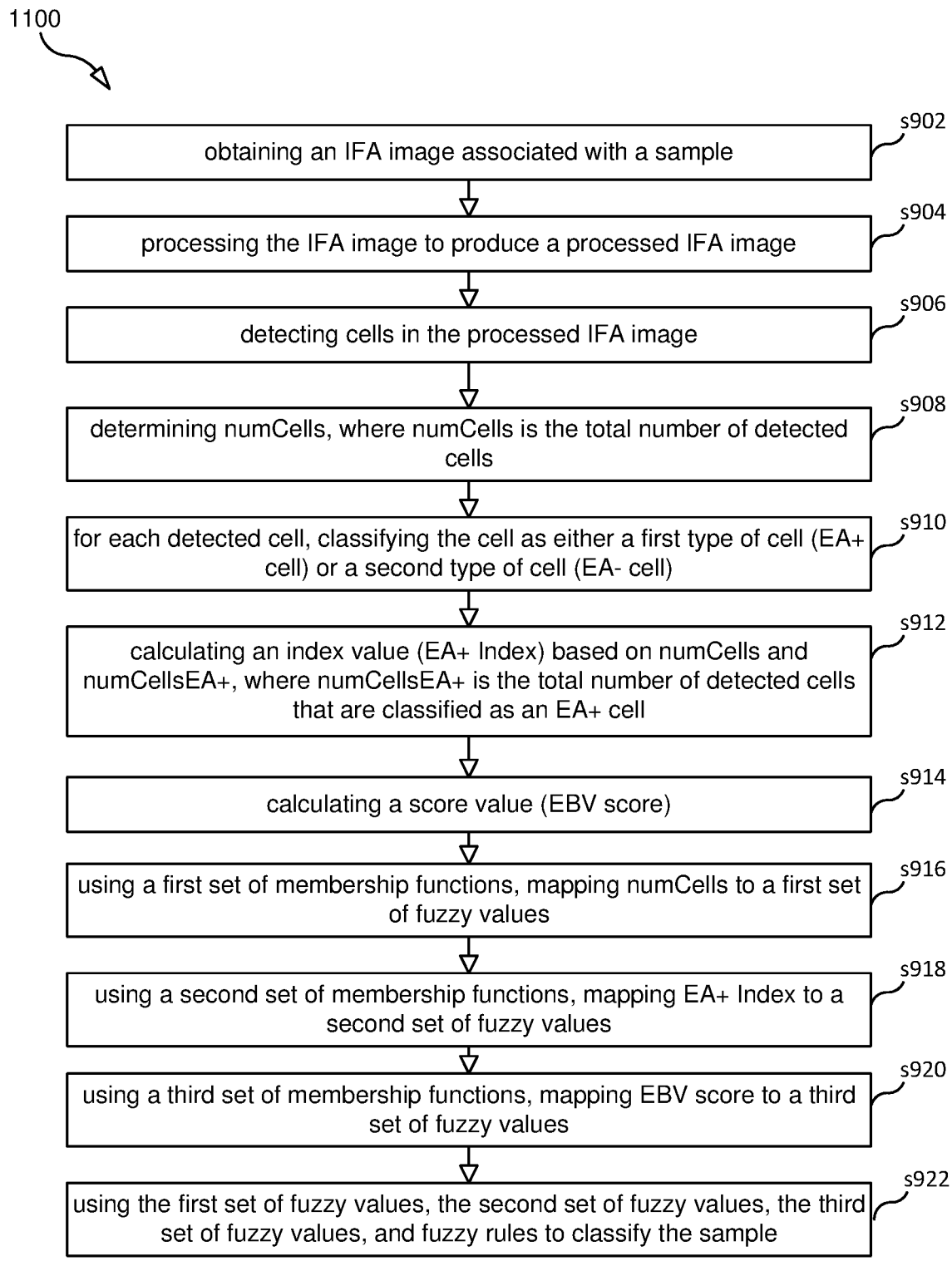
FIG. 9 is a flowchart illustrating a process according to an embodiment.

A1. A computer implemented method (900, see FIG. 9) for detecting a disease, the method comprising: obtaining (s902) an immunofluorescence assay (IFA) image associated with a sample (e.g., serum sample); processing (s904) the IFA image to produce a processed IFA image; detecting (s906) cells in the processed IFA image; determining (s908) numCells, where numCells is the total number of detected cells; for each detected cell, classifying (s910) the cell as either a first type of cell (EA+ cell) or a second type of cell (EA− cell); calculating (s912) an index value (EA+ Index) based on numCells and numCellsEA+, where numCellsEA+ is the total number of detected cells that are classified as an EA+ cell; calculating (s914) a score value (EBV score); using (s916) a first set of membership functions, mapping numCells to a first set of fuzzy values; using (s918) a second set of membership functions, mapping EA+ Index to a second set of fuzzy values; using (s920) a third set of membership functions, mapping EBV score to a third set of fuzzy values; and using (s922) the first set of fuzzy values, the second set of fuzzy values, the third set of fuzzy values, and fuzzy rules to classify the sample.

A2. The method of embodiment A1, wherein the step of classifying the cells is performed by a convolutional neural network (CNN).

A3. The method of embodiment A2, wherein, for each detected cell, the CNN determines a probability index (PI) value for the cell and uses the PI value and a predetermined threshold to determine whether or not the cell should be classified as a EA+ cell.

A4. The method of embodiment A3, wherein the CNN classifies a particular cell as an EA+ cell as a result of determining that the PI value for the particular cell exceeds the threshold.

A5. The method of embodiment A1, wherein classifying the cell as either a first type of cell (EA+ cell) or a second type of cell (EA− cell) comprises: obtaining pixel information for the cell; using the pixel information to calculate a probability index (PI) value for the cell; and uses the PI value and a predetermined threshold to determine whether or not the cell should be classified as a EA+ cell.

A6. The method of embodiment A5, wherein the pixel information for the cell comprises a set of pixel intensity values, wherein each pixel intensity value in the set of pixel intensity values indicates the intensity of a pixel corresponding to the cell.

A7. The method of embodiment A6, wherein using the pixel information to calculate the PI value for the cell comprises calculating: $PI = \sigma/\mu$, where $\mu$ is the mean of the pixel intensity values, and $\sigma$ is standard deviation of the pixel intensity values.

A8. The method of any one of embodiments A3-A7, wherein the EBV score is the average of the PI values that are greater than or equal to the predetermined threshold, or the EBV score is the average of the PI values that are greater than the predetermined threshold.

B1. A computer program (1043) comprising instructions (1044) which when executed by processing circuitry (1002) of a disease detection system causes the disease detection system (200) to perform the method of any one of embodiments A1-A8.

B2. A carrier containing the computer program of embodiment B1, wherein the carrier is one of an electronic signal, an optical signal, a radio signal, and a computer readable storage medium (1042).

C1. A disease detection system (200), the disease detection system (200) being adapted to perform the method of any one of embodiments A1-A8.

D1. A disease detection system (200), the disease detection system (200) comprising: processing circuitry (1002); and a memory (1042), the memory (1042) containing instructions (1044) executable by the processing circuitry, whereby the disease detection system (200) is operative to perform the method of any one of embodiments A1-A8.

Conclusion

The advantages of the IFA derive from its ability to identify and enumerate cellular staining patterns. In particular, IFA excels in the detection of low titers with faintly fluorescing positive patterns as well as the exclusion of false positive samples which have bright but negative patterns. These advantages are predicated on a highly trained IFA evaluator with suitable personality traits and stamina for microscopy work. Encapsulating such expertise in scalable computational models is the key to providing IFA services on a large scale.

To build the computational model, we wanted to leverage the enormous strides in performance made by convolutional neural networks (CNN's) but also address the issue that CNN's are uninterpretable black boxes in many respects. Such interpretability issues are a concern for applications which involve or influence medical decisions. Hybrid systems are one approach to mitigating this issue (see, e.g., reference [16]). In this disclosure, it is shown that an explainable rule-based fuzzy framework incorporating a CNN module gave the best of both worlds. Fuzzy inference provided the broad framework by synthesizing control rules based on human experience while the specific task of cell image recognition was performed by the CNN. Restricting the CNN to analyzing single cell patterns reduces computational complexity compared to analyzing the entire image. Such an approach also allows for cellular pattern classes to be easily modified in the future.

Besides improvements to scalability, precise quantitative output based on a single sample dilution is perhaps the other major advantage of automated analysis. In the manual method, a human evaluator must choose one of five increasing dilutions at which positive patterns (if detected) are no longer visible to the naked eye. This can be especially challenging near the decision boundary where it is often difficult to differentiate between a positive 1:10 titer and a negative sample. Since samples close to this boundary are usually presumed to have a higher error rate, we had originally included an 'uncertainty filter' to refer such samples for further human evaluation. Interestingly however, DeLFI exceeded our expectations by practically matching (AUC=0.985, κ=0.90) human performance without need for the filter. We attribute this performance to the high quality of the fuzzy rules and training image dataset, both of which were created in close consultation with our IFA expert. Notably, DeLFI's precise quantitative output allows the decision boundary to be fine-tuned for different clinical scenarios. For instance, by choosing an appropriate crisp output cutoff, DeLFI can be used to either maximize sensitivity (sen=0.992, spe=0.916) or specificity (sen=0.945, spe=0.986) (Table 4). Maximizing sensitivity would be advantageous when screening for endemic NPC in high-prevalence populations. Conversely, maximizing specificity would minimize false positives when screening for NPC in non-endemic populations. Such flexibility is impossible to achieve with such granularity using manual IFA titers.

This disclosure represents an early step in enabling a large number of labs running the same software model to achieve high performance, thereby raising the overall quality and reproducibility of IFA testing. This opens the door to accurate and scalable population screening for NPC using the IFA.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Screening Test Review Committee. Report of the Screening Test Review Committee. (2019).

[2] Chan, S. H. et al. MOH Clinical Practice Guidelines 1/2010. (2010).

[3] Middeldorp, J. M. Epstein-Barr Virus-Specific Humoral Immune Responses in Health and Disease. Curr. Top. Microbiol. Immunol. 391, 289-323 (2015).

[4] Tay, J. K. et al. The Role of Epstein-Barr Virus DNA Load and Serology as Screening Tools for Nasopharyngeal Carcinoma. Otolaryngol. Head Neck Surg. 155, 274-280 (2016).

[5] Tay, J. K. et al. A comparison of EBV serology and serum cell-free DNA as screening tools for nasopharyngeal cancer: Results of the Singapore NPC screening cohort. Int. J. Cancer (2019) doi:10.1002/ijc.32774.

[6] Chan, S. H. et al. Epstein Barr virus (EBV) antibodies in the diagnosis of NPC—comparison between IFA and two commercial ELISA kits. Singapore Med. J. 39, 263-265 (1998).

[7] Coghill, A. E. et al. Epstein-Barr virus serology as a potential screening marker for nasopharyngeal carcinoma among high-risk individuals from multiplex families in Taiwan. Cancer Epidemiol. Biomarkers Prev. 23, 1213-1219 (2014).

[8] Hutajulu, S. H. et al. Seroprevalence of IgA anti Epstein-Barr virus is high among family members of nasopharyngeal cancer patients and individuals presenting with chronic complaints in head and neck area. PLoS One 12, e0180683 (2017).

[9] Paramita, D. K., Fachiroh, J., Haryana, S. M. & Middeldorp, J. M. Evaluation of commercial EBV RecombLine assay for diagnosis of nasopharyngeal carcinoma. J. Clin. Virol. 42, 343-352 (2008).

[10] Chan, K. C. A. et al. Analysis of Plasma Epstein—Barr Virus DNA to Screen for Nasopharyngeal Cancer. N. Engl. J. Med. 377, 513-522 (2017).

[11] Nicholls, J. M. et al. Negative plasma Epstein-Barr virus DNA nasopharyngeal carcinoma in an endemic region and its influence on liquid biopsy screening programmes. Br. J. Cancer (2019) doi:10.1038/s41416-019-0575-6.

[12] Ricchiuti, V., Adams, J., Hardy, D. J., Katayev, A. & Fleming, J. K. Automated Processing and Evaluation of Anti-Nuclear Antibody Indirect Immunofluorescence Testing. Front. Immunol. 9, 927 (2018).

[13] Horsfall, A. C., Venables, P. J., Mumford, P. A. & Maini, R. N. Interpretation of the Raji cell assay in sera containing anti-nuclear antibodies and immune complexes. Clin. Exp. Immunol. 44, 405-415 (1981).

[14] Goh, S. M. P. et al. Increasing the accuracy and scalability of the Immunofluorescence Assay for Epstein Barr Virus by inferring continuous titers from a single sample dilution. J. Immunol. Methods 440, 35-40 (2017).

[15] Landis, J. R. & Koch, G. G. The measurement of observer agreement for categorical data. Biometrics 33, 159-174 (1977).

[16] Bonanno, D., Nock, K., Smith, L., Elmore, P. & Petry, F. An approach to explainable deep learning using fuzzy inference. in Next-Generation Analyst V vol. 10207 102070D (International Society for Optics and Photonics, 2017).

[17] Knapp, B., Fuzzy Sets and Pattern Recognition, available at URL; www.cs.princeton.edu/courses/archive/fal107/cos436/HIDDEN/Knapp/fuzzy.htm.

The invention claimed is:

1. A computer implemented method for detecting a disease, the method comprising:
    obtaining an immunofluorescence assay (IFA) image associated with a sample;
    processing the IFA image to produce a processed IFA image;
    detecting cells in the processed IFA image;
    determining numCells, where numCells is the total number of detected cells;
    for each detected cell, classifying the cell as either a first type of cell (EA+ cell) or a second type of cell (EA− cell);
    calculating an index value (EA+ Index) based on numCells and numCellsEA+, where numCellsEA+ is the total number of detected cells that are classified as an EA+ cell;
    calculating a score value (EBV score);
    using a first set of membership functions, mapping numCells to a first set of fuzzy values;
    using a second set of membership functions, mapping EA+ Index to a second set of fuzzy values;
    using a third set of membership functions, mapping EBV score to a third set of fuzzy values; and
    using the first set of fuzzy values, the second set of fuzzy values, the third set of fuzzy values, and fuzzy rules to classify the sample.

2. The method of claim 1, wherein the step of classifying the cells is performed by a convolutional neural network (CNN).

3. The method of claim 2, wherein, for each detected cell, the CNN determines a probability index (PI) value for the cell and uses the PI value and a predetermined threshold to determine whether or not the cell should be classified as a EA+ cell.

4. The method of claim 3, wherein the CNN classifies a particular cell as an EA+ cell as a result of determining that the PI value for the particular cell exceeds the threshold.

5. The method of claim 1, wherein classifying the cell as either a first type of cell (EA+ cell) or a second type of cell (EA− cell) comprises:
    obtaining pixel information for the cell;
    using the pixel information to calculate a probability index (PI) value for the cell; and
    using the PI value and a predetermined threshold to determine whether or not the cell should be classified as a EA+ cell.

6. The method of claim 5, wherein the pixel information for the cell comprises a set of pixel intensity values, and
    each pixel intensity value in the set of pixel intensity values indicates the intensity of a pixel corresponding to the cell.

7. The method of claim 6, wherein using the pixel information to calculate the PI value for the cell comprises calculating:
    $PI = \sigma/\mu$, where
    $\mu$ is the mean of the pixel intensity values, and
    $\sigma$ is standard deviation of the pixel intensity values.

8. The method of claim 3, wherein
    the EBV score is the average of the PI values that are greater than or equal to the predetermined threshold, or the EBV score is the average of the PI values that are greater than the predetermined threshold.

9. A non-transitory computer readable medium storing a computer program comprising instructions which when executed by processing circuitry of a disease detection system causes the disease detection system to perform the method of claim 1.

10. A disease detection system, the disease detection system comprising:
    processing circuitry; and
    a memory, the memory containing instructions executable by the processing circuitry, wherein the disease detection system is configured to perform a process comprising:
        obtaining an immunofluorescence assay (IFA) image associated with a sample;
        processing the IFA image to produce a processed IFA image;
        detecting cells in the processed IFA image;
        determining numCells, where numCells is the total number of detected cells;
        for each detected cell, classifying the cell as either a first type of cell (EA+ cell) or a second type of cell (EA− cell);
        calculating an index value (EA+ Index) based on numCells and numCellsEA+, where numCellsEA+ is the total number of detected cells that are classified as an EA+ cell;
        calculating a score value (EBV score);
        using a first set of membership functions, mapping numCells to a first set of fuzzy values;
        using a second set of membership functions, mapping EA+ Index to a second set of fuzzy values;
        using a third set of membership functions, mapping EBV score to a third set of fuzzy values; and
        using the first set of fuzzy values, the second set of fuzzy values, the third set of fuzzy values, and fuzzy rules to classify the sample.

11. The disease detection system of claim 10, wherein
    the disease detection system comprises a convolutional neural network (CNN), and
    the step of classifying the cells is performed by the CNN.

12. The disease detection system of claim 11, wherein, for each detected cell, the CNN determines a probability index (PI) value for the cell and uses the PI value and a predetermined threshold to determine whether or not the cell should be classified as a EA+ cell.

13. The disease detection system of claim 12, wherein the CNN classifies a particular cell as an EA+ cell as a result of determining that the PI value for the particular cell exceeds the threshold.

14. The disease detection system of claim 10, wherein classifying the cell as either a first type of cell (EA+ cell) or a second type of cell (EA− cell) comprises:
    obtaining pixel information for the cell;
    using the pixel information to calculate a probability index (PI) value for the cell; and
    using the PI value and a predetermined threshold to determine whether or not the cell should be classified as a EA+ cell.

15. The disease detection system of claim 14, wherein
    the pixel information for the cell comprises a set of pixel intensity values, and
    each pixel intensity value in the set of pixel intensity values indicates the intensity of a pixel corresponding to the cell.

16. The disease detection system of claim 15, wherein using the pixel information to calculate the PI value for the cell comprises calculating:

PI=σ/μ, where
μ is the mean of the pixel intensity values, and
σ is standard deviation of the pixel intensity values.

17. The disease detection system of claim 12, wherein
the EBV score is the average of the PI values that are greater than or equal to the predetermined threshold, or
the EBV score is the average of the PI values that are greater than the predetermined threshold.

* * * * *